Oct. 25, 1955   F. H. HUNTLEY   2,721,915
ELECTRIC SWITCH CONTROL
Filed Sept. 8, 1950   4 Sheets-Sheet 1
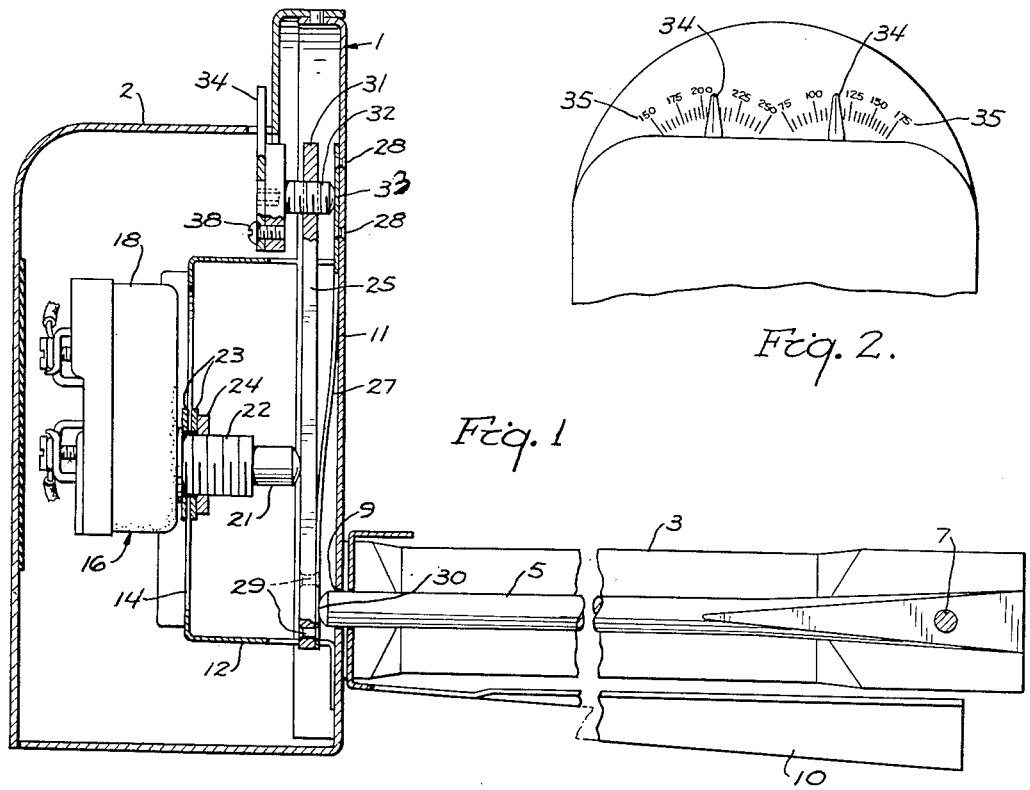
Fig. 1.
Fig. 2.
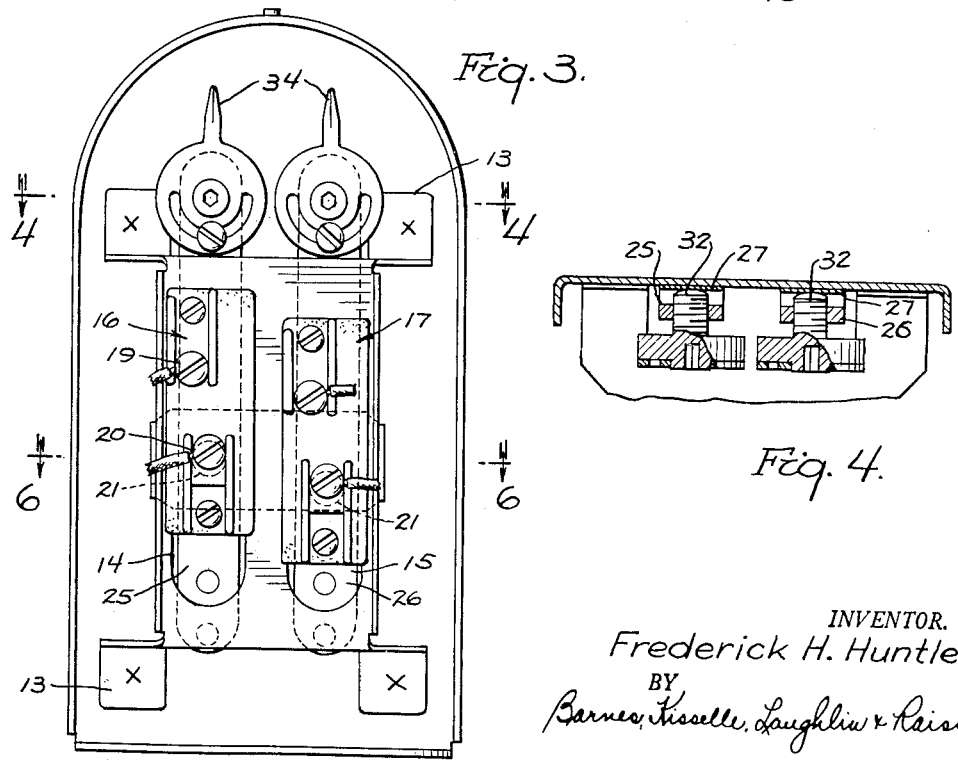
Fig. 3.
Fig. 4.
INVENTOR.
Frederick H. Huntley
BY
Barnes, Kisselle, Laughlin & Raisch
Attorneys.

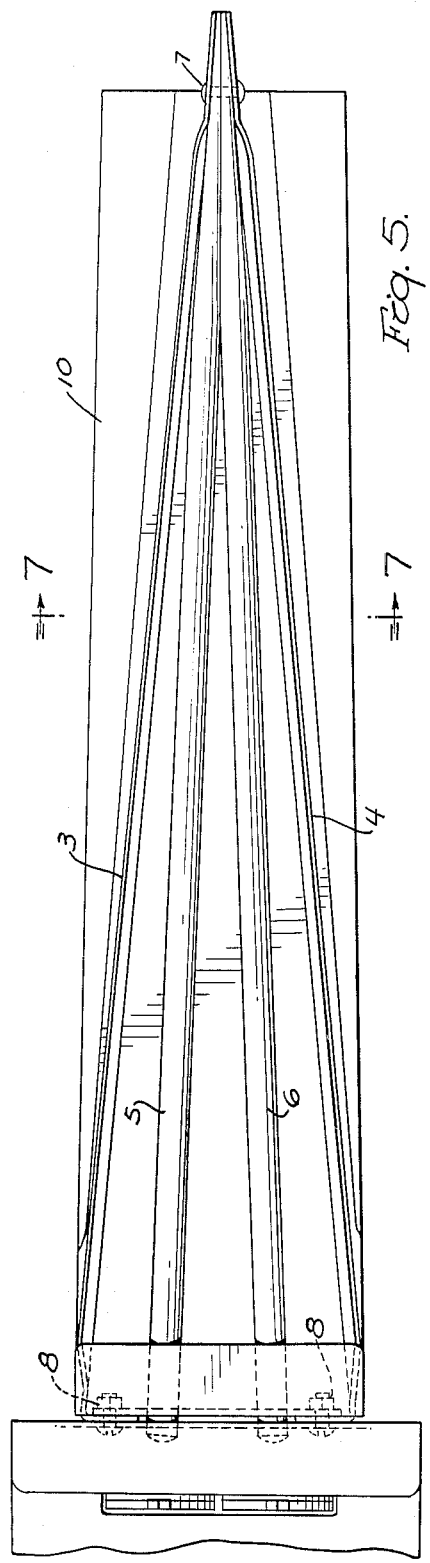
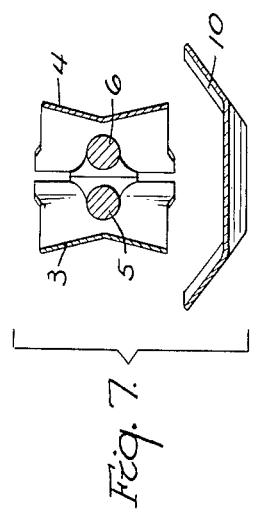
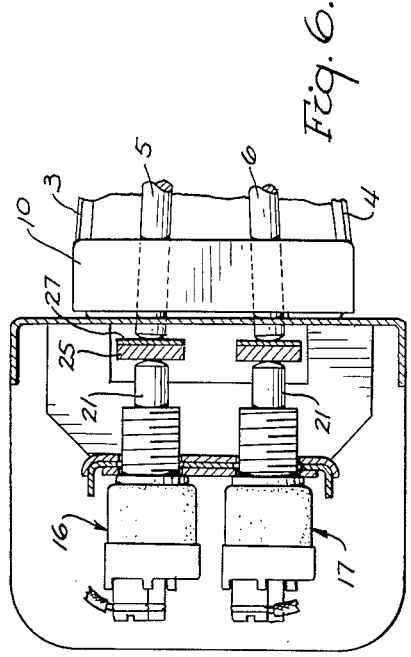

Oct. 25, 1955  F. H. HUNTLEY  2,721,915
ELECTRIC SWITCH CONTROL
Filed Sept. 8, 1950  4 Sheets-Sheet 3
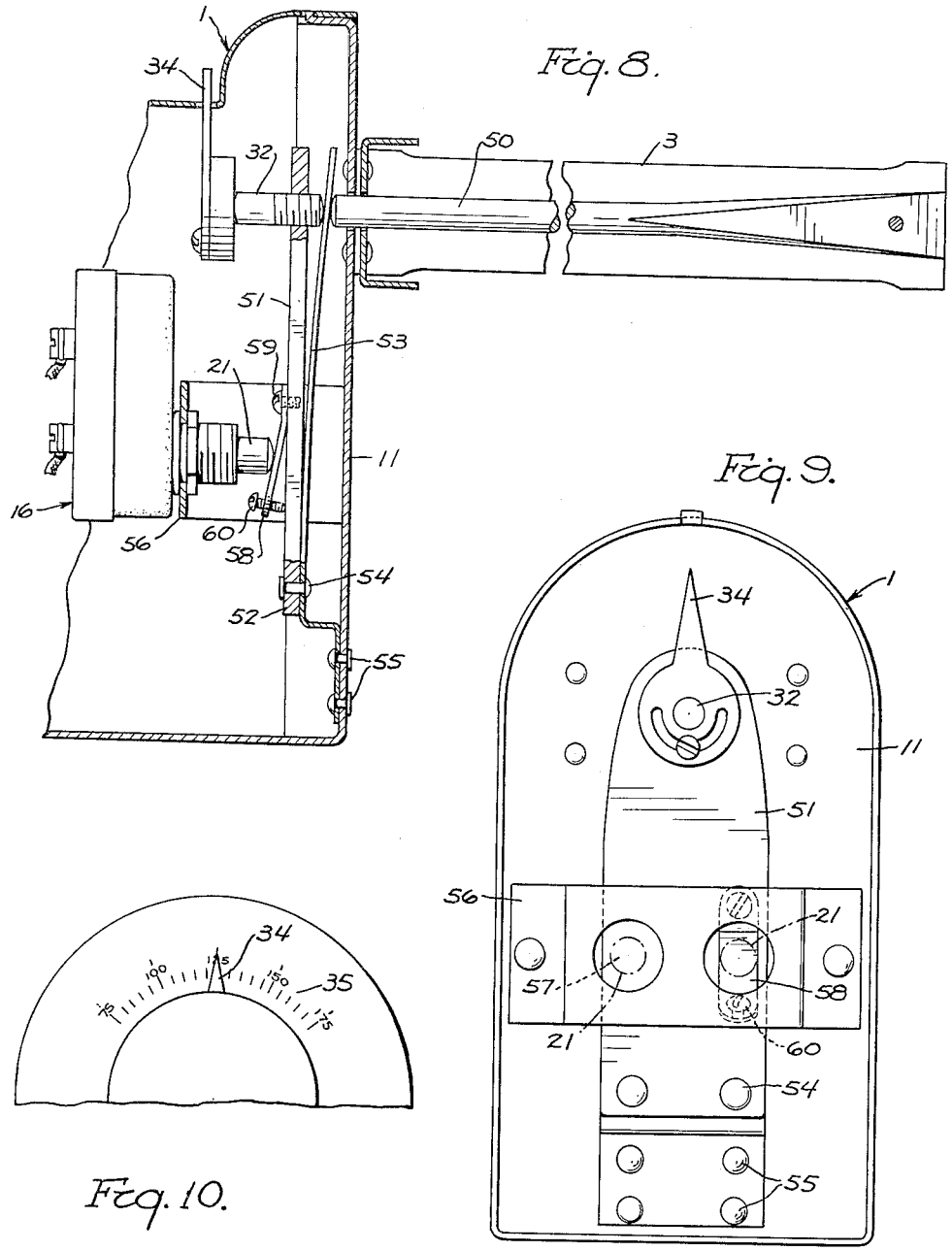
INVENTOR.
Frederick H. Huntley
BY
Barnes, Kisselle, Laughlin & Raisch
Attorneys.

Oct. 25, 1955     F. H. HUNTLEY     2,721,915
ELECTRIC SWITCH CONTROL

Filed Sept. 8, 1950     4 Sheets-Sheet 4

INVENTOR.
Frederick H. Huntley
BY
Barnes, Kisselle, Laughlin & Raisch
Attorneys.

United States Patent Office 2,721,915
Patented Oct. 25, 1955

2,721,915
ELECTRIC SWITCH CONTROL

Frederick H. Huntley, Lansing, Mich., assignor to Motor Wheel Corporation, Lansing, Mich., a corporation of Michigan Application September 8, 1950, Serial No. 183,795

23 Claims. (Cl. 200—137)

This invention relates to an electric switch control and more particularly to an electric switch control for heating systems.

It is common practice in heating systems to provide the system with at least two thermostatic or temperature responsive switches. The one switch stops and starts the pump or blower which circulates the heating medium and the other switch is a limiting switch which cuts off the source of heat whenever the temperature of the heating medium reaches a predetermined maximum temperature. In the case of a warm air furnace the bonnet switch turns on the blower for circulating the hot air whenever the air reaches a predetermined temperature, for example, about 125° F., and turns off the blower when the temperature of the air within the bonnet falls below about 125° F., for example, 105° F. The limit switch, which is also mounted on the bonnet of the furnace, cuts off the source of heat (oil burner, stoker, or gas burner) whenever the air within the bonnet reaches a predetermined maximum temperature such, for example, as 175° F. and turns on the source of heat again when the temperature falls to a safe limit.

It is an object of this invention to produce an electric switch control of the above general type which is of simple construction, efficient and reliable in operation, and which is economical to build.

Fig. 1 is a longitudinal cross section through the switch control mechanism which is the subject of this invention.

Fig. 2 is a detail elevation showing the adjustment fingers and temperature scales.

Fig. 3 is an end view of the control with the cover removed.

Fig. 4 is a section along the line 4—4 of Fig. 3.

Fig. 5 is a top plan view of the control.

Fig. 6 is a section taken along the line 6—6 of Fig. 3.

Fig. 7 is a section taken along the line 7—7 of Fig. 5.

Fig. 8 is a longitudinal cross sectional view showing a modified form of switch control and Fig. 9 is an end view of the same with the cover and switches removed.

Fig. 10 shows the adjustment finger and temperature scale for the switch control shown in Figs. 8 and 9.

Figure 12:
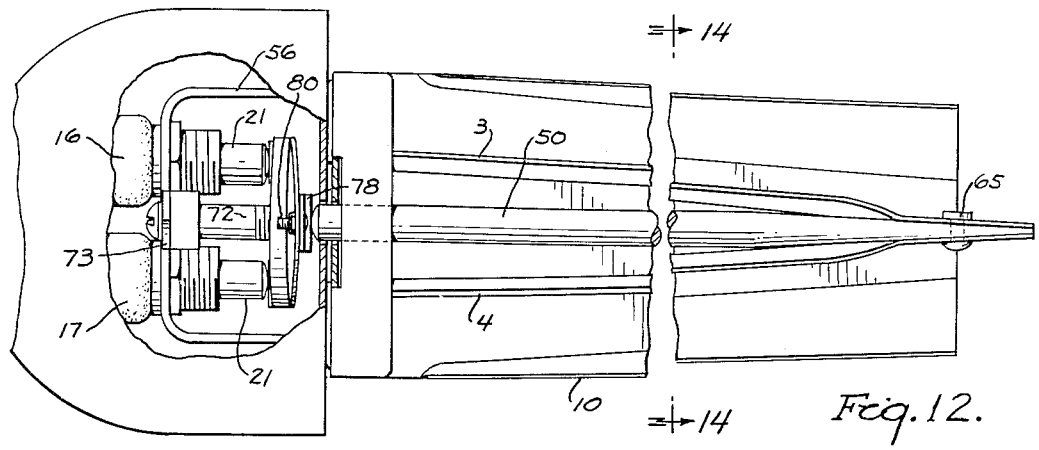
Fig. 12 is a top plan view of the same.

Referring more particularly to the drawings, the switch control comprises a housing 1 having a removable cover 2. The housing 1 supports a thermostat in the form of two metal strips 3 and 4 having a relatively high coefficient of expansion, such as aluminum, and two rods 5 and 6 having a relatively lower coefficient of expansion, such as steel. The strips 3 and 4 and rods 5 and 6 are fixed together at their outer ends by any suitable means, such as rivet 7. The aluminum strips 3 and 4 are secured at their inner ends to housing 1 by bolts 8 and the steel rods are free to move through openings 9 in housing 1.

The thermostat unit 3–7 is usually mounted above the heat producing unit and to prevent radiant heat from affecting the thermostat a shield member 10 is provided. Shield 10 can be made from any suitable mtaerial, such as metal, and protects the aluminum strips 3 and 4 and steel rods 5 and 6 from radiant heat from the source of heat or heat exchanger. In a hot air furnace the thermostat 3–7 will be mounted within the bonnet and housing 1 without the bonnet. As the temperature of the aluminum strips and steel rods rises they will both expand or lengthen and since aluminum has the higher coefficient of expansion, strips 3 and 4 will expand or lengthen more than the steel rods 5 and 6 with the net result that the rods upon a rise in temperature will move generally away from the back 11 of the housing 1, that is, to the right Fig. 1.

Housing 1 is provided with a bridge 12 provided with four legs 13 which are spot welded or otherwise fixed to the back 11 of housing 1. Bridge 12 is provided with two parallel vertical slots 14 and 15 and supports two electric switches 16 and 17. Switches 16 and 17 can be of any suitable type such, for example, as a snap switch, commonly known to the trade as a "micro" switch. For an example of such a switch see the United States patents to McGall 1,960,020 and Riche 2,182,856.

Each switch comprises a case 18, terminals 19 and 20, and an operating plunger 21 which is reciprocably mounted in a nipple 22 fixed to case 18. The mounting for each switch 16 and 17 on bridge 12 is identical. Nipple 22 is passed through slot 14 in bridge 12 and a pair of washers 23 are positioned over nipple 22 and overlap bridge 12 on opposite sides of slot 14. A nut 24 is turned down on nipple 22 to lock the switch 16 in position. The position of each switch 16 and 17 can be adjusted vertically in slots 14 and 15.

For actuating each switch plunger 21 there is provided in this form of control separate flat metal bars 25 and 26. Each bar is supported on the back 11 of housing 1 by a flat leaf spring 27. The upper end of each leaf spring 27 is secured to back 11 by rivets 28 and the lower end of each spring is secured to the bars by rivets 29. Each spring 27 is the sole means for supporting its respective bar in housing 1. Thermostat rod 5 operates switch 16 and thermostat rod 6 operates switch 17. The inner ends 30 of rods 5 and 6 each contact the lower end of a spring 27 as shown. Springs 27 are normally flat and in the absence of rods 5 and 6 would rest flat against the back 11 of housing 1. The upper or free end 31 of bars 25 and 26 carries an adjusting screw 32, the outer end of which contacts its corresponding spring 27 as at 33. The inner end of screw 32 carries a pointer 34 which cooperates with a temperature indicating scale 35. Each pointer 34 is adjustable on its respective screw 32. The pointers 34 are adjusted to indicate the temperature on the scales 35 to which the switches are adjusted, the adjustment of which will be later described. The pointers are movable on screws 32 and released and locked by set screws 38.

The operation of the switch control is as follows: Assuming that the control is mounted on the bonnet of a hot air furnace, as the temperature of the air within the bonnet increases rods 5 and 6 move to the right, Fig. 1, thereby permitting springs 27 to flex toward the back 11 of the housing and carry bars 25 and 26 to the right. Each plunger 21, which is a spring plunger, will follow its respective bar to the right. Each plunger 21 has a certain amount of free motion in and out before it opens and closes its respective switch. When the temperature within the bonnet reaches, say, 115° F., plnnger 21 for switch 17 will have moved sufficiently to the right to close switch 17 and turn on the fan. If the temperature in the bonnet should continue to rise, bars 25 and 26 would continue to follow ends 30 of rods 5 and 6 to the right and when a temperature of, e. g., 210° F., Fig. 2, is reached, then plunger 21 for limit switch 16 will have moved sufficiently to the right to open switch 16 and thus shut off the burner or heat source. As the temperature in the bonnet drops, then rods 5 and 6 move inwardly of housing 1 or toward the left, Fig. 1, flexing springs 27 to the left about anchors 28 and causing plungers 21 to move inwardly or toward the left. When the temperature drops, e. g., 10 to 15 degrees below 210° F., the plunger 21 will again close switch 16 and start the burner, that is, again turn on the source of heat. When the burner is turned off by the room thermostat (not shown), then the temperature in the bonnet will drop below 115° F. (10° to 15° F., e. g.) and at that time the end 30 of rod 6 will have moved sufficiently to the left to again open switch 17 and turn off the blower.

From the above it is evident that by turning screw 32 inwardly to increase the distance between end 31 of bar 25 and the anchored end 28 of spring 27, the temperature at which limit switch 16 will open to turn off the heat source and the temperature at which fan switch 17 will close to turn on the fan are both raised. By turning screw 32 outwardly or to the left to decrease the distance between end 31 of bar 25 and anchored end 28 of spring 27, the temperature at which limit switch 16 will turn off the heat and limit switch 17 will turn on the fan is lowered. The above is evident because by turning screw 32 inwardly or toward the right, Fig. 1, bar 25 moves to the left and correspondingly moves plunger 21, Fig. 1, inwardly, thus requiring a greater outward travel (to the right) of end 30 of rod 5 before limit switch 16 will open.

As shown, switch 16 is the limit switch and will open an electrical circuit and cut off the burner or source of heat when the temperature within the bonnet reaches about 210° F., as illustrated in Fig. 2. Switch 17 is illustrated as the bonnet or fan switch which, when the temperature within the bonnet reaches about 115° F., will close, completing the electrical circuit to the fan or blower for circulating the air. Limit switch 16 both opens and closes at a higher temperature than fan switch 17 closes and opens.

As has been described, there is a lag or temperature differential between the closing and opening of the fan switch and between the opening and closing of the limit switch. The adjustment of the switches to the temperature at which the fan switch closes and to which temperature its pointer 34 has been set and the temperature at which the limit switch opens and to which temperature its pointer 34 has been set has also been described.

The temperature differential is adjusted for each switch by moving it up or down in the slot 14 of the bridge 12. Each switch has definite travel of plunger 21 to open or close the switch. Therefore the plunger 21 is located on the bar 25 at the proper place to give the opening and closing positions the proper or desired temperature difference. The plunger 21 will travel a less distance than end of bar 5 depending on its distance from bar 5 and since end of bar 5 has a temperature travel relation, the proper temperature travel relation on the switch can be obtained by moving the switch in slot 14 to obtain the proper relation generally designated as temperature differential. The temperature differential is the difference between the temperature at which a switch operates in one direction and the temperature at which it thereafter operates in the opposite direction. Stating it briefly, the adjustment for the initial operating temperature of each switch is by screw 32, the adjustment of the switches to give the proper temperature differential is by moving the switches in the slot 14.

In the modified form of construction shown in Figs. 8, 9 and 10, the thermostat is mounted on the back 11 of the housing 1 and is the same as thermostat 3–7, Fig. 5, except that only a single steel rod 50 is used instead of two rods 5 and 6. Only a single steel rod is utilized because the control for the two "micro" switches 16 and 17 requires only one operating bar 51 affixed at its lower end 52 to a flat spring 53 by any suitable means, such as rivets 54. Flat spring 53 is secured at its lower end by means or rivets 55 to back 11 of housing 1. Two "micro" switches 16 and 17 are mounted upon a bridge 56 which is secured to back 11. Switches 16 and 17 are the same as above described.

Plunger 21 of fan switch 17 contacts bar 51 directly as at 57 whereas plunger 21 of limit switch 16 contacts a spring 58 secured at one end by screw 59 to bar 51 and provided at the other end with an adjusting screw 60. Thus, by turning screw 60 inwardly so as to swing the lower end of spring 58 outwardly or away from bar 51, the temperature at which limit switch 21 will open to turn off the burner or source of heat is thereby raised, and vice versa by turning screw 60 to the left to bring the lower end of plate or spring 58 closer to bar 51, the temperature at which limit switch 16 will open to turn off burner is thereby lowered.

The upper end of bar 51 is provided with a calibrating screw 32 and pointer 34 the same as in the principal form of the invention. The calibrating screw 32 operates the same in both forms of the invention, Figs. 1 and 8, to change the temperatures at which plungers 21 open and close the switches 16 and 17. Adjusting screw 60 co-operates with plate 58 to provide a higher operating temperature for limit switch 16 than for fan switch 17.

Figure 11:
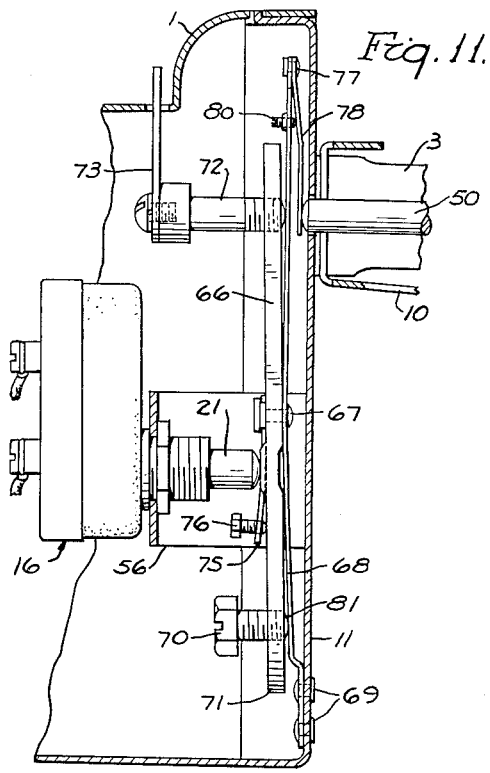
Fig. 11 is a fragmentary longitudinal cross section through a second modified form of switch control.
Figure 13:
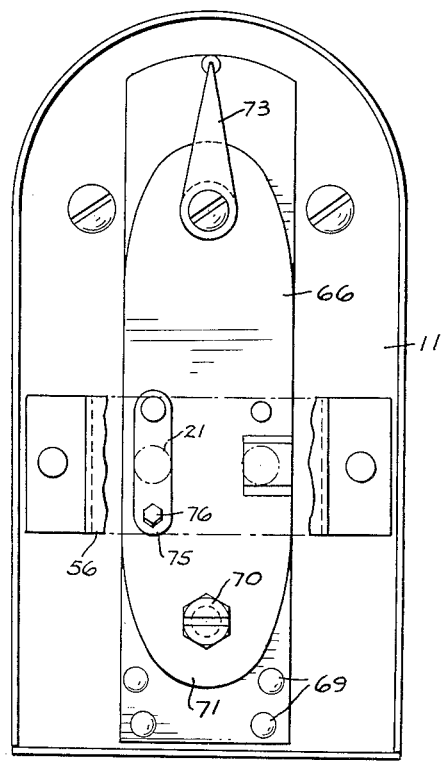
Fig. 13 is an end view of the same with the cover and switches removed.
Figure 14:
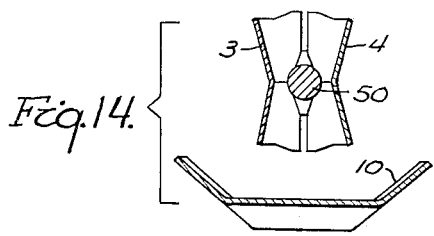
Fig. 14 is a section taken along the line 14—14 of Fig. 12.

In the form of the invention shown in Figs. 11, 12, 13 and 14, the thermostat is the same as that shown in Fig. 8 and comprises the two aluminum strips 3 and 4 and but a single steel bar 50 fixed together at their outer ends 65. In this form of the invention but a single operating bar 66 is provided. Operating bar 66 is secured adjacent its midpoint by means of a rivet 67 to a flat spring 68. Spring 68 is secured at its lower end to back 11 of housing 1 by rivets 69. "Micro" switches 16 and 17 are mounted upon bridge 56, Fig. 11. Switches 16 and 17 are not adjustable up and down upon bridge 56. The lower end 71 of bar 66 carries an adjusting screw 70, the outer end 81 of which bears against spring 68. The upper end of bar 66 carries an adjusting screw 72. One end of screw 72 bears against spring 68 and the other end carries a pointer 73 which is used to adjust the device to the temperature at which it will operate. After the assembly has been made, the pointer 73 is set at a given temperature, the thermostat 50, 3 and 4 raised to that temperature and the calibrating screw 70 is turned so as to cause the switch 17 to operate at that temperature.

Since the limit switch 16 operates at a higher temperature than the fan switch 17, bar 66 is provided with a spring strip 75 of any suitable metal or alloy such as beryllium copper or steel which carries an adjusting screw 76, the outer end of which bears against bar 66. The upper end of spring 75 is secured to bar 66 by rivets 67. By turning screw 76 inwardly to swing the lower end of strip 75 away from bar 66, the operating temperature at which limit switch 16 opens to turn off the burner is raised, and vice versa when adjusting screw 76 is turned out to bring the lower end of strip 75 closer to bar 66. Attached to the upper end of spring 68 by rivet 77 is a flat spring 78, the lower end of which bears against the inner end of rod 50. An adjusting screw 80 is carried by spring 68 and bears against spring 78. Spring 78 is more flexible than spring 68 and therefore spring 78 will flex a given amount under loss of pressure from rod 50 before spring 68 begins to move. Thus, by adjustment of screw 80, the amount the end of rod 50 moves before the bar 66 and the plunger 21 on fan switch 17 moves can be varied. The adjustment of screw 80 adjusts the differential on switch 17 only. This can be readily understood by referring particularly to Figs. 11 and 12. As the temperature rises, rod 50 moves to the right; and this has the effect of putting the control into action as the bar 66 moves to the right and out of action as the bar 66 moves to the left.

Movement of the bar 66 to the right to follow movement of bar 50 to the right is controlled by the flexure of both springs 78 and 68. Since spring 78 is not as strong as spring 68, it will move further upon movement of bar 50 than the stiffer spring 68. However, the movement of bar 66 results from the flexure of both springs 78 and 68.

Switch 17, which is normally open, closes when bar 66 has moved a sufficient distance to the right. The amount that bar 50 has to move to the right to produce movement of bar 66 this sufficient distance is obviously a function of the tension in spring 78 which is adjusted by screw 80. Therefore, the differential of switch 17 is adjusted by screw 80. In other words, the effect of the distance that bar 50 has to travel to cause switch 17 to operate can be adjusted by screw 80.

After bar 66 has travelled far enough to operate switch 17, it will continue to move to the right if the temperature continues to rise, thereby continuing the movement of bar 50 to the right. When the bar 66 has moved to a point that is effective to operate switch 16, switch 16 opens. The point at which switch 16 opens with reference to the movement of bar 66 can be regulated by the adjustments 76. However, by the time bar 66 has moved far enough to the right to operate switch 17 and then continues to move to a point where it operates switch 16, the effect of spring 78 is nil or so nearly so that it can be disregarded. Hence, adjustment of screw 80 regulates the differential of only switch 17; and the differential of switch 16 is inherent in the switch construction and is not adjustable. Normally, this temperature differential is between 10° and 15° F.

I claim:

1. An electric switch control for heating apparatus comprising a support, a thermostatic element on said support and movable in response to changes in temperature, a spring mounted on said support in the path of movement of said thermostatic element and arranged to be flexed in response to movement of said thermostatic element, a switch on said support, an actuating member mounted on said spring and arranged to actuate the switch when said spring is flexed, said actuating member having a free end portion spaced from the connection between said spring and actuating member and overlying said spring, and adjusting means mounted on said actuator and acting between said free end portion of said actuating member and said spring to thereby vary the distance the thermostatic element moves to actuate the switch whereby the temperature at which the switch operates is varied.

2. The combination set forth in claim 1 wherein said actuating member comprises a relatively rigid bar having a fixed connection with said spring, said bar being operatively connected with said switch at a point intermediate the ends of said bar.

3. The combination set forth in claim 1 wherein said spring is fixed at one end to said support, the other end of said spring being movable relative to said support and disposed in the path of movement of said thermostatic element.

4. The combination set forth in claim 1 wherein said adjusting means comprises a screw threadedly engaged with a free end portion of said actuating member and acting against said spring whereby said screw may be turned in either one direction or the other to increase or decrease the spacing between said spring and said free end portion of said actuating member.

5. The combination set forth in claim 4 including manually engageable means rotatably supported on said screw, means for locking said manually engageable means on said screw, and a temperature scale associated with said manually engageable means.

6. An electric switch control for heating apparatus comprising a support, a thermostat mounted on said support and having an element thereof movable in response to changes in temperature, a leaf spring secured on said support and having a movable end operatively associated with the movable element of said thermostat, said movable element of said thermostat being arranged to flex said leaf spring in proportion to the change in temperature of said thermostat, a bar member, means connecting said bar member to said leaf spring such that the leaf spring is adapted to be flexed about its connection with said bar toward and away from said bar member, adjusting means on said bar member spaced from the connection between said bar member and spring and acting between said bar member and spring for varying the degree to which said spring is flexed relative to said bar member, and a switch having an actuating member operatively connected with said bar member at a point spaced from the connection between said bar member and said spring.

7. An electric switch control for heating apparatus comprising a support, a thermostat mounted on said support and having an element thereof movable in response to changes in temperature, a leaf spring secured on said support and having a movable end operatively associated with the movable element of said thermostat, said movable element of said thermostat being arranged to flex said leaf spring in proportion to the change in temperature of said thermostat, a bar member, means connecting said bar member to said leaf spring such that the leaf spring is adapted to be flexed about its connection with said bar toward and away from said bar member, adjusting means on said bar member spaced from the connection between said bar member and spring and acting between said bar member and spring for varying the degree to which said spring is flexed relative to said bar member, and a switch having an actuating member operatively connected with said bar member at a point spaced from the connection between said bar member and said spring, said switch being bodily adjustable on said support in a direction toward and away from the connection between said bar member and spring whereby the ratio of travel of said actuating member relative to the travel of the movable element of said thermostat may be varied.

8. An electric switch control for heating apparatus comprising a support, a thermostat mounted on said support and having an element thereof movable in response to changes in temperature, a leaf spring secured on said support and having a movable end operatively associated with the movable element of said thermostat, said movable element of said thermostat being arranged to flex said leaf spring in proportion to the change in temperature of said thermostat, a bar member, means connecting said bar member to said leaf spring such that the leaf spring is adapted to be flexed about its connection with said bar toward and away from said bar member, adjusting means on said bar member spaced from the connection between said bar member and spring and acting between said bar member and spring for varying the degree to which said spring is flexed relative to said bar member, and a switch having an actuating member operatively connected with said bar member at a point spaced from the connection between said bar member and said spring, said switch being bodily adjustable on said support in a direction longitudinally of said bar.

9. The combination set forth in claim 6 wherein the operative connection between said bar and actuating member includes a second leaf spring secured to said bar member, a screw at a free end of said spring and engaging said bar for flexing said last mentioned spring toward and away from said bar member, said actuating member engaging said free end of said last mentioned spring.

10. The combination set forth in claim 6 including a second leaf spring secured to a free end of said first mentioned spring and having a free end disposed between the movable element of said thermostat and said first mentioned spring, said second spring being more flexible than said first spring, and adjusting means for flexing the free end of said second spring toward and away from said first spring.

11. The combination set forth in claim 6 wherein said adjusting means comprises a screw acting between said bar member and said spring and including a manually engageable member rotatably supported on said screw, means for locking said manually engageable member on said screw so that the screw may be rotated by rotating said manually engageable member, and a temperature scale associated with said manually engageable member.

12. An electric switch control for heating apparatus comprising a support, a thermostatic element on said support and movable in response to changes in temperature, a leaf spring on said support operatively connected with said movable thermostatic element and arranged to be flexed in response to changes in temperature of said thermostatic element, a pair of independent switches on said support, switch actuating means connected to said leaf spring and operatively associated with said switches to open and close said switches independently of one another in response to changes in temperature of said thermostatic element, the connection between said switch actuating means and said leaf spring being such that said spring can be flexed about its connection with said switch actuating means toward and away from said actuating means, and screw means acting between said actuating means and said spring for varying the degree to which said spring is flexed relative to said actuating means.

13. An electric switch control for heating apparatus comprising a support, a pair of thermostatic elements on said support and movable in response to changes in temperature, a pair of springs mounted on said support one each in the paths of movement of said thermostatic elements and arranged to be flexed in response to movement of said thermostatic elements, a pair of switches on said support, a pair of bars mounted one on each of said springs and arranged to actuate the respective switches when the springs are flexed, said switches each having an operating member engaging a corresponding one of said bars, one of said switches being movable on said support in a direction longitudinally of its corresponding one of said bars, said bars each having a free end portion spaced from the connection between the spring and the bar and overlying the spring on which it is mounted and adjusting means mounted on said bars and acting between the free end portions of said bars and said springs to thereby vary the distance the thermostatic elements move to actuate the respective switches whereby the temperatures at which the switches operate are varied.

14. An electric switch control for heating apparatus comprising a support, a thermostat on said support having an element movable in response to changes in temperature of said thermostat, a leaf spring secured at one end on said support and having a free end operatively associated with the movable element of said thermostat, said movable element being arranged to flex said spring in response to changes in temperature of said thermostat, a bar member mounted on said spring such that the spring may be flexed about its connection with said bar toward and away from said bar member, screw means for adjusting the extent to which said spring is flexed relative to said bar member, a pair of switches on said support each having an operating member movable to close the switch and to open the switch, said operating members being associated with said bar member such that the operating members are moved in response to movement of said bar member, and means for varying the position of one of said operating members relative to said bar member.

15. The combination set forth in claim 14 including means forming a lost-motion connection between the movable member of said thermostat and the free end of said spring, and means for adjusting the extent of lost motion between said spring and the movable element of said thermostat.

16. An electric switch control for heating apparatus comprising a support, a thermostatic element on said support and movable in response to changes in temperature, a spring fixedly mounted at one end on said support and arranged to be flexed in response to movement of said thermostatic element, a switch on said support, an actuating member mounted on said spring and arranged to be moved by said spring to actuate the switch, means connecting said actuating member to said spring such that the spring is adapted to be flexed about its connection with said actuating member toward and away from said actuating member, and adjusting means adjustably mounted on said actuating member and acting between said actuating member and said spring for varying the degree to which said spring is flexed relative to said actuating member to thereby vary the distance the thermostatic element moves to actuate the switch whereby the temperature at which the switch operates is varied.

17. The combination set forth in claim 16 wherein said actuating member comprises a bar and said spring comprises a leaf spring, said bar being disposed such as to overlie the leaf spring.

18. The combination set forth in claim 17 wherein said leaf spring is connected at one end with said support, said bar being connected with said leaf spring adjacent the connection between the leaf spring and the support.

19. The combination set forth in claim 17 wherein said leaf spring is connected at one end to said support, said bar being connected to the central portion of said leaf spring.

20. An electric switch control for heating apparatus comprising a support, a thermostatic element on said support and movable in response to changes in temperature, a spring fixedly mounted at one end on said support and arranged to be flexed in response to movement of said thermostatic element, a switch on said support, an actuating member arranged to be moved by said spring to actuate the switch, means connecting said actuating member to said spring such that the spring is adapted to be flexed about its connection with said actuating member toward and away from said actuating member, and adjusting means on said actuating member for varying the degree to which said spring is flexed relative to said actuating member to thereby vary the distance the thermostatic element moves to actuate the switch whereby the temperature at which the switch operates is varied, said actuating member comprising a bar and said spring comprising a leaf spring, said bar being disposed such as to overlie the leaf spring, the leaf spring being anchored at one end to said support and said bar being connected with the free end of said leaf spring.

21. An electric switch control for heating apparatus comprising a support, a thermostatic element on said support and movable in response to changes in temperature, a spring fixedly mounted at one end on said support and arranged to be flexed in response to movement of said thermostatic element, a switch on said support, an actuating member arranged to be moved by said spring to actuate the switch, means connecting said actuating member to said spring such that the spring is adapted to be flexed about its connection with said actuating member toward and away from said actuating member, and adjusting means on said actuating member for varying the degree to which said spring is flexed relative to said actuating member to thereby vary the distance the thermostatic element moves to actuate the switch whereby the temperature at which the switch operates is varied, said switch being movable on said support in a direction towards and away from the connection between said actuating member and said spring.

22. The combination set forth in claim 16 wherein said actuating member comprises a bar and said spring comprises a leaf spring, said adjusting means comprising a screw having a threaded connection with said bar and having an end thereof contacting said spring, said screw having a head, a manually engageable member on said head and rotatable with said screw and a temperature scale associated with said manually engageable means.

23. The combination set forth in claim 22 wherein said manually engageable member is rotatably supported on said screw and including means for locking said manually engageable member on said screw.

References Cited in the file of this patent

UNITED STATES PATENTS

| | | |
|---|---|---|
| 1,678,507 | Hart | July 24, 1928 |
| 1,944,358 | McNamara | Jan. 23, 1934 |
| 2,404,843 | Huber | July 30, 1946 |
| 2,440,025 | Singleton | Apr. 20, 1948 |
| 2,480,216 | Bowland | Aug. 30, 1949 |